US010025806B2

(12) United States Patent
Lu et al.

(10) Patent No.: US 10,025,806 B2
(45) Date of Patent: Jul. 17, 2018

(54) FAST FILE CLONE USING COPY-ON-WRITE B-TREE

(71) Applicant: VMware, Inc., Palo Alto, CA (US)

(72) Inventors: Yunshan Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 342 days.

(21) Appl. No.: 14/837,166

(22) Filed: Aug. 27, 2015

(65) Prior Publication Data

US 2017/0060898 A1     Mar. 2, 2017

(51) Int. Cl.
*G06F 17/30* (2006.01)
*G06F 3/06* (2006.01)

(52) U.S. Cl.
CPC .......... *G06F 17/30327* (2013.01); *G06F 3/06* (2013.01); *G06F 17/30091* (2013.01)

(58) Field of Classification Search
CPC ................................................ G06F 17/30327
See application file for complete search history.

(56) References Cited

U.S. PATENT DOCUMENTS

2007/0083482 A1* 4/2007 Rathi ...................... G06F 3/048

OTHER PUBLICATIONS

Twigg, A., Byde, A., Milos, G., Moreton, T., Wilkes, J. and Wilkie, T. (2011). Stratified B-trees and versioning dictionaries. https://arxiv.org/abs/1103.4282.*
Dragga, C. and Santry D. (Jun. 2015). GCTrees: Garbage collecting snapshots. 31st Symposium on Mass Storage Systems and Technologies (MSST), Santa Clara, CA, 2015, pp. 1-12. http://ieeexplore.ieee.org/stamp/stamp.jsp?tp=&arnumber=7208282&isnumber=7208272.*
Ohad Rodeh; "B-trees, Shadowing, and Clones", ACM Transactions on Computational Logic, vol. V, No. N, Aug. 2007, pp. 1-26.
Btrfs, "Trees", Oct. 2, 2012, available at <https://btrfs.wiki.kernel.org/index.php?title=Trees&oldid=13181>.
Btrfs, "Btrfs design", Jan. 11, 2015, available at <https://btrfs.wiki.kernel.org/index.php?title=Btrfs_design&oldid=29275>.

* cited by examiner

*Primary Examiner* — Syed H Hasan
(74) *Attorney, Agent, or Firm* — Patterson & Sheridan LLP

(57) ABSTRACT

A file system uses a B-tree data structure to organize file data. The file system may maintain an index node (inode) representing a file and having entries that map to extents of the file. When the file system detects an index node, through updates, has exceeded a threshold number of extents, the file system converts the file to a copy-on-write (COW) B-tree data structure containing the entries representing the extents of the file. To clone the file, the file system uses copies of the index node and the root node of the COW B-tree data structure.

15 Claims, 5 Drawing Sheets

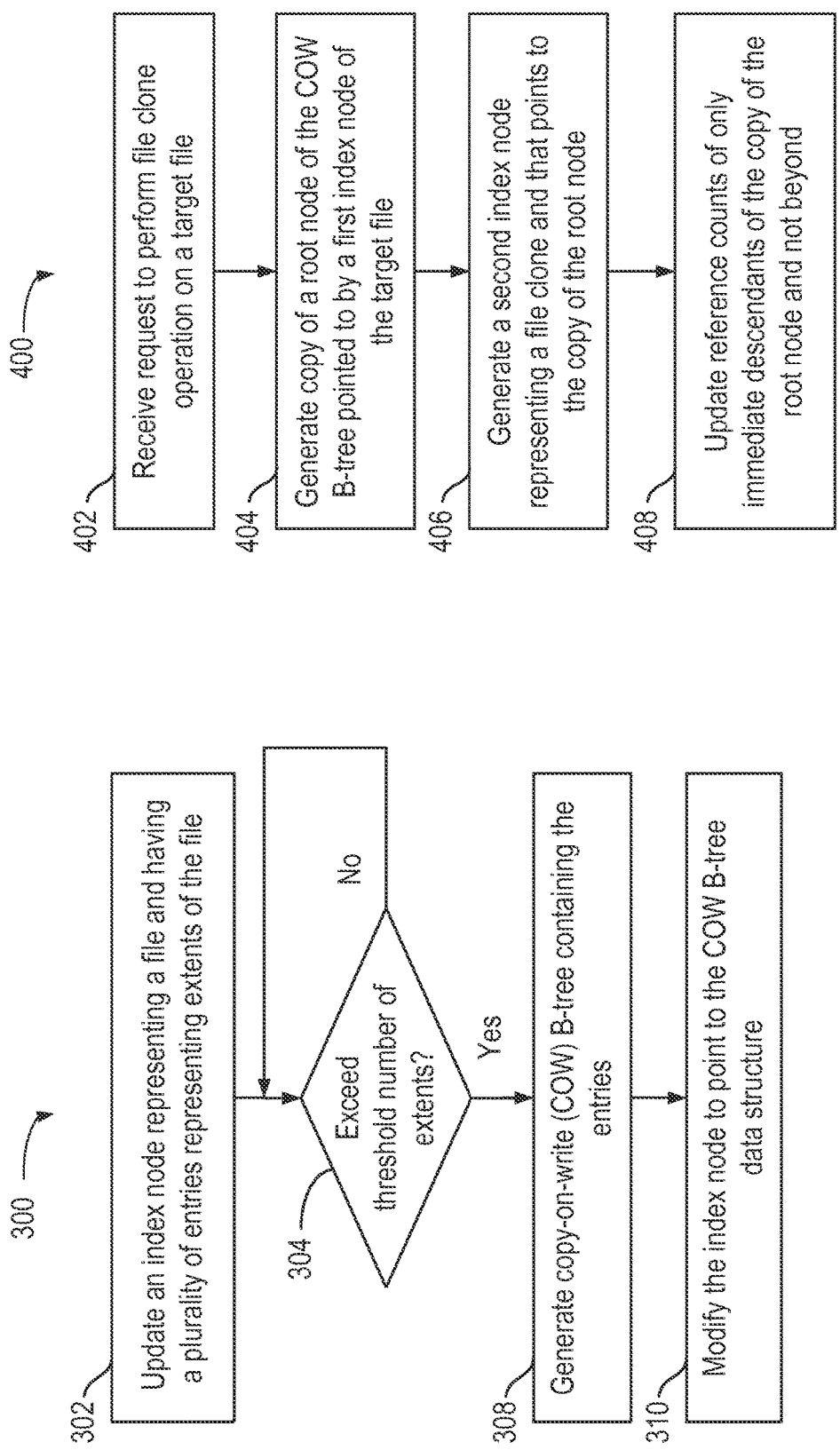

FAST FILE CLONE USING COPY-ON-WRITE B-TREE

BACKGROUND

Data stored in a storage device is often accessible using a block device interface. The data is typically visible and accessible to any client with access to the storage device. Operating systems or other storage clients can erase data from the storage device, format the storage device, and otherwise manipulate and change the data.

Some B-tree-based file systems, such as Btrfs™, provide a clone operation that atomically creates a copy-on-write snapshot of a file. Such cloned files are sometimes referred to as reflinks. By cloning, the file system does not create a new link pointing to an existing mode; instead, the file system creates a new mode that initially shares the same disk blocks with the original file. That is, such B-tree-based file systems can clone a file by copying all file logical-to-physical mapping information. However, this approach becomes slow and time-consuming when the file is fragmented.

BRIEF DESCRIPTION OF THE DRAWINGS

FIG. 3 is a flow diagram illustrating a method for managing file data, according to one embodiment of the present disclosure.

FIG. 4 is a flow diagram illustrating a method for performing a file clone operation, according to one embodiment of the present disclosure.

DETAILED DESCRIPTION

Figure 1:
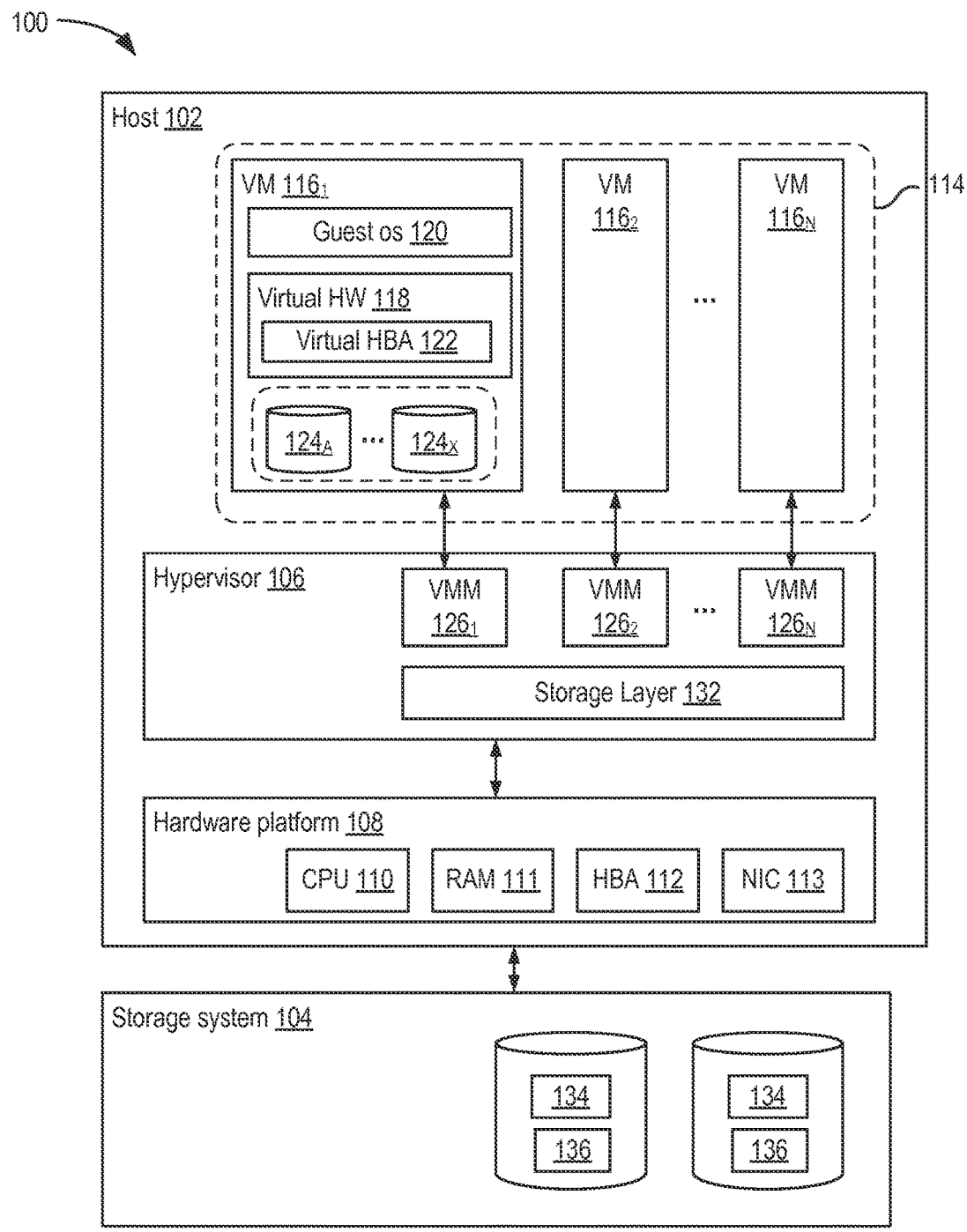
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc. In some embodiments, storage system 104 may be implemented as software-defined storage such as VMware Virtual SAN that clusters together server-attached hard disks and/or solid state drives (HDDs and/or SSDs), to create a flash-optimized, highly resilient shared datastore designed for virtual environments.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and a network interface card (NIC) 113. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a VMM may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct virtual machine monitor (VMM) layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Storage layer 132 maintains on-disk storage metadata 134 for facilitating the dynamic allocation of storage blocks 136 (sometimes referred to as disk blocks, disk sectors, or sectors) and other operations on storage system 104. For example, storage layer 132 is configured to receive and/or execute space allocation requests for storage blocks 136 that can used to handle requests to write data to storage system 104. In some embodiments, storage layer 132 uses storage metadata 134 for such tasks as remembering which storage blocks 136 are allocated and which storage blocks are free (e.g., bitmaps), or allowing quick random access to an arbitrary block in a particular file (e.g., B-trees).

Figure 2:
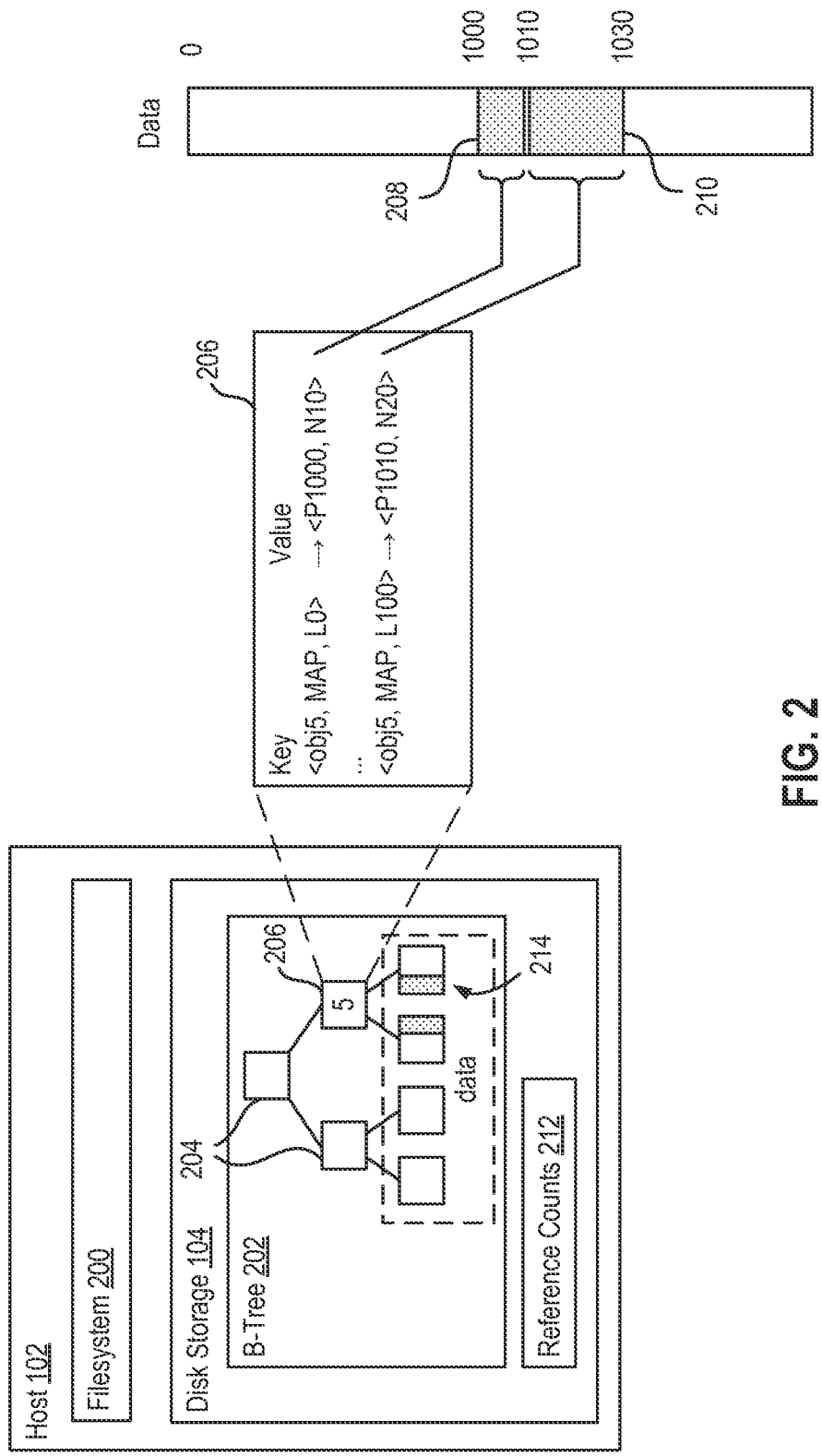
FIG. 2 is a block diagram depicting a file system maintaining data structures for processing file operations, according to one embodiment of the present disclosure.

FIG. 2 is a block diagram depicting a file system 200 maintaining data structures for processing file operations, according to one embodiment of the present disclosure. A host 102 includes a file system 200 that controls how data within storage system 104 is stored and retrieved. File system 200 may be storage layer 132 described in conjunction with FIG. 1, or in other embodiments, may be any file system or storage subsystem.

In one embodiment, file system 200 maintains one or more B-tree data structures 202 within storage 104 to manage the file system's metadata and features. File system 200 further maintains reference counts 212 associated with blocks and/or nodes within B-tree 202. While embodiments of the present disclosure are discussed in terms of a B-tree data structure, it is understood that variations of the B-tree data structure may be used, including B+ trees, Copy-on-write B+ trees (i.e., B+ trees maintaining node reference counts and do not have leaf chaining), Log-structured Merging Trees, red-black trees, and other tree-like data structures.

In one embodiment, b-tree data structure 202 may be comprised of a plurality of nodes 204, which can represent files or directories or portions of files or directories. Each node 204 contains entries (sometimes referred to as items) that can represent extents of a file, entries that represent directory contents and structure, and entries containing other file system-related metadata. Each node 204 is associated with and may be indexed by an mode number. In the example shown in FIG. 2, a node 206 within B-tree 202 is associated an mode number "5".

In one embodiment, each entry within a node 204 may represented as a key-value pair. The key of an entry may include the mode number associated with the entry, such that all entries (including entries in other nodes 204) can be logically grouped together in B-tree 202. The key of an entry includes a type field storing a value or code indicating the type of information, e.g., basic mode entry information (e.g., INODE_ITEM) or directory information (e.g., DIR_ITEM). The key of an entry may further include other parameters, such as an offset field that indicates the byte offset for a particular entry in the node. For example, in case of a file extent, the offset field indicates the logical byte offset from the start value of the extent of the file. In one embodiment, the value portion of an entry includes a physical block number field indicating the physical address or offset of the extent within disk and a size field indicating a number of data blocks occupied by the extent. In one or more embodiments, each entry within a node 204 may be represented by the following key-value format:

<inode, type, logical_blkoff>=<physical_blknum, num_of_blocks>

Example entries of a node (e.g., node 206) are depicted FIG. 2. Node 206 represents a file and has been assigned an mode number 5 (depicted as an object ID "obj5"). Leaf nodes 214 points to the data of the file. Node 206 includes a first entry (i.e., "<obj5, MAP, L0>→<P1000, N10>") representing a first extent 208 of data for the file starting at logical block address 0 ("L0") found at the physical block address 1000 ("P1000") and extending for 10 blocks ("N10") to P1010. Node 206 includes a second entry (i.e., "<obj5, MAP, L100>→<P1010, N20>") representing a second extent 210 of data for the file starting at logical block address 100 ("L100") and extending for 20 blocks ("N20") to P1030. Both depicted entries specify a type value ("MAP") indicating the entries map to file extent data. Node 206 may include other, additional entries, which have been omitted for clarity of illustration. The formats and values depicted in FIG. 2 are an example and other formats or designated values may be used instead.

Embodiments of the present disclosure provide an adaptive technique to store file mapping information. When a file is not very fragmented, index nodes can store logical-to-physical mapping information within index nodes according to known techniques for B-tree based file systems. As the file mapping information grows (i.e., the file becomes more fragmented, having many extents), another file mapping copy-on-write (COW) B-tree is created. The file mode points to the newly created mapping tree. When cloning the file, the file system only needs to copy the root of the file mapping tree and increase reference counts 212 of all tree nodes pointed by the root of the file mapping tree. Accordingly, embodiments of the present disclosure reduce the time complexity of cloning a file from O(N) to O(1).

FIG. 3 is a flow diagram illustrating a method 300 for managing file data, according to one embodiment of the present disclosure. While method 300 is described in conjunction with the systems shown in FIGS. 1 and 2, it should be recognized that other systems may be used to perform the described methods. By way of example, method 300 may further be explained in conjunction with FIGS. 5A to 5C, which depict example data structures for managing and storing file data.

Method 300 begins at step 302, where file system 200 updates an index node representing a file and having a plurality of entries representing extents of the file. Each entry of the plurality of entries includes metadata that maps logical addresses to physical addresses of data blocks for the file. File system 200 may update the index node by adding a new entry to the node, or updating or removing an existing entry.

Figure 5A:
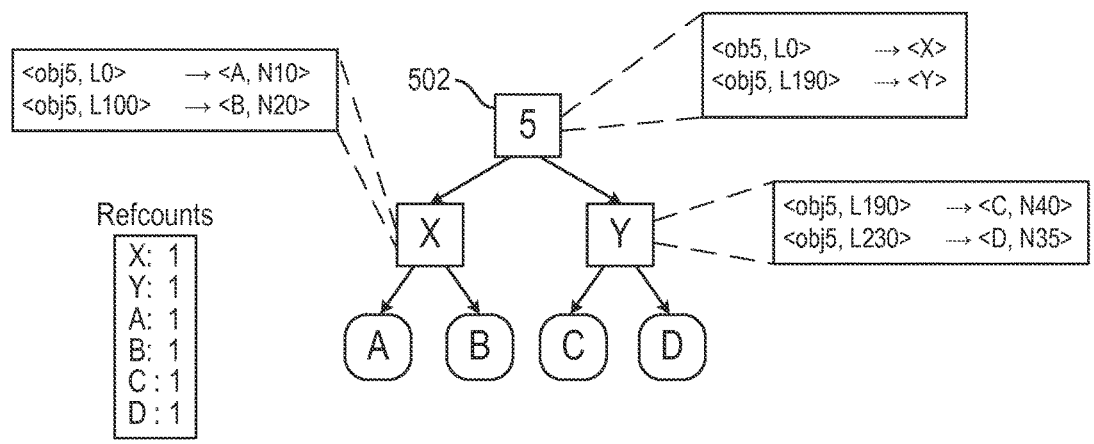
FIGS. 5A to 5C are block diagrams depicting example file management and file clone operations, according to embodiments of the present disclosure.

For example, FIG. 5A depicts an index node 502 is a root node with an mode number "5" and containing entries (i.e., "<obj5, L0>→<X>", "<obj5, L190>→<Y>") representing extents of that file. In this particular example, the entries point to other tree nodes X and Y which point to leaf nodes A, B, C, and D which stores the data of the file. A first and second extents of the file are contained in node A (as indicated by entries "<obj5, L0>→<A, N10>", "<obj5, L100>→<B, N20>" in node X), and third and fourth extents of the file are contained in node B (as indicated by entries "<obj5, L190>→<C, N40>", "<obj5, L230>→<D, N35>" in node Y). The entries and nodes depicted are for illustration purposes; the nodes may contain many more entries and extents of the file. Inode identifiers and type fields are omitted for clarity of illustration. File system 200 maintains a reference count indicating that each of nodes A, B, C, D, and E are each referenced by 1 other node.

At step 304, file system 200 checks the index node and determines whether the updated index node has exceeded a threshold number of extents. In some embodiments, file system 200 determines the updated index node has exceeded the threshold number of extents based on the number of entries contained in the index node. The threshold number may be a pre-determined value (e.g., 500 extents) or may be dynamically configured. In one implementation, the threshold number may be selected as the number of entries that fit into several tree nodes. In some embodiments, file system 200 makes the determination of whether the updated index node contains excessive entries responsive to an update of the index node itself. In other embodiments, file system 200 makes the determination of whether an index node contains excessive entries on a periodic basis, e.g., checking each node every 100 seconds.

Figure 5B:
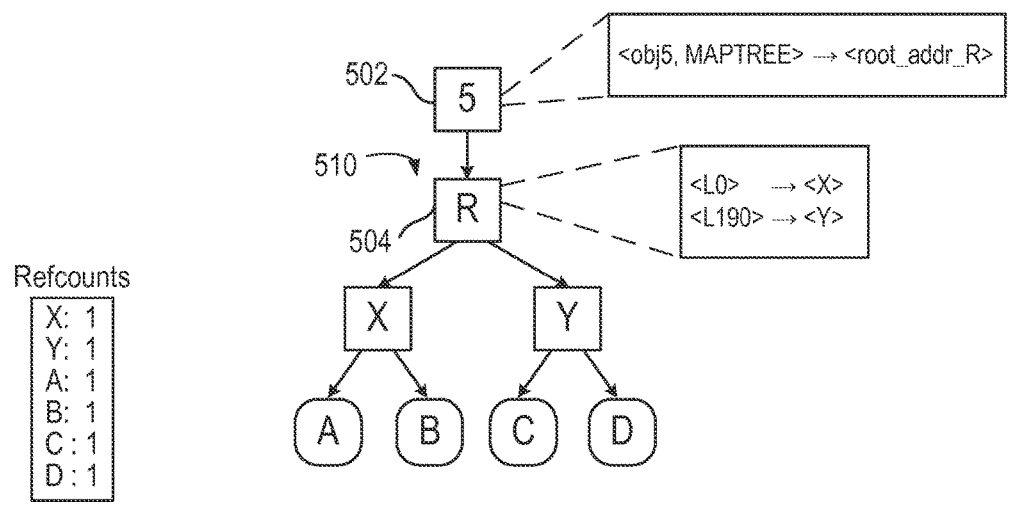
Figure 5C:
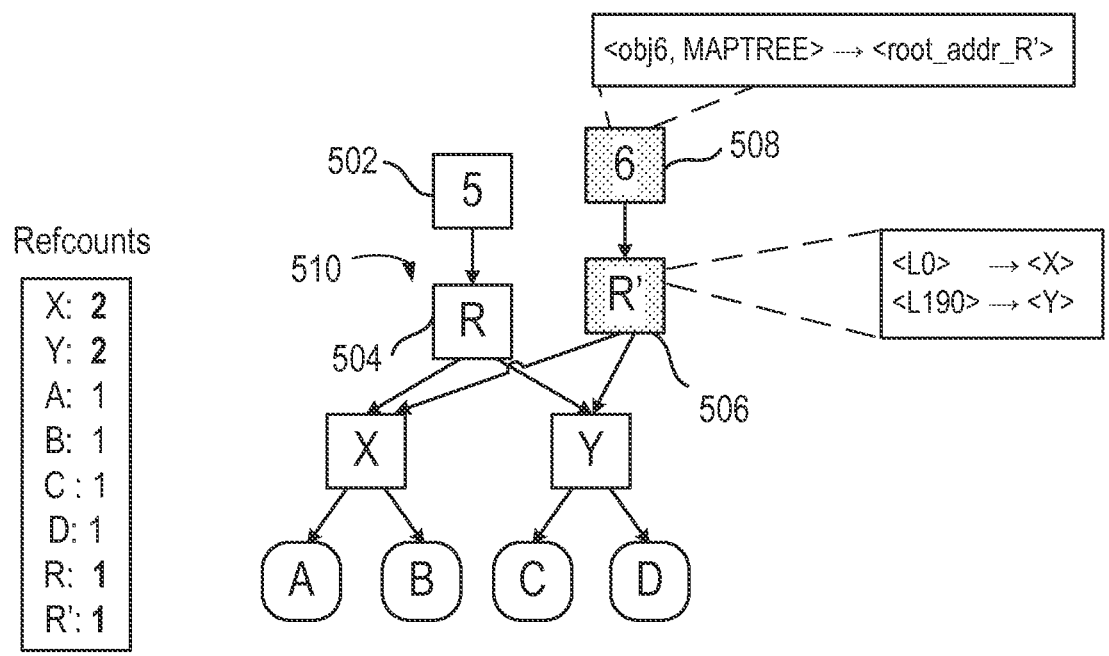

At step 306, responsive to determining that the updated index node has exceeded the threshold number of extents, file system 200 generates a COW B-tree data structure containing the plurality of entries representing the extents of the file. For example, FIG. 5B depicts a COW B-tree data structure 510 having a root node 504 with an mode number "R" and containing entries (e.g., "<L0>→<X>", "<L190>→<Y>") representing the extents of the file. In some embodiments, the entries from the index node 502 are copied over to root node 504 of the COW B-tree data structure. The mode number (e.g., "obj5") may be removed from key of the entries ("obj5") as the entries in a COW B-tree nodes may now refer to multiple files.

At step 308, further responsive to determining that the updated index node has exceeded the threshold number of extents, file system 200 modifies the index node to point to the COW B-tree data structure 510. In some embodiments, file system 200 inserts a key-value entry into the index node. The key of the entry may comprise a map-tree type and a value of the entry includes an address of the COW B-tree data structure. For example, FIG. 5B depicts the file system has replaced the entries in index node 502 representing the extents of the file with a new key-value entry (e.g., "<obj5, MAPTREE>→<root_addr_R>"). The key of the entry includes a type field (e.g., "MAPTREE") indicating that the entry maps to a COW B-tree data structure, and the value of the entry includes an address of the root node 504 of the COW B-tree data structure 510 (e.g., "root_addr_R").

FIG. 4 is a flow diagram illustrating a method 400 for performing a file clone operation, according to one embodiment of the present disclosure. While method 400 is described in conjunction with the systems shown in FIGS. 1 and 2, it should be recognized that other systems may be used to perform the described methods.

Method 400 begins at step 402, where file system 200 receives a request to perform file clone operation on a target file. In some prior approaches, a file system might create a copy of the entire file in a block-by-block fashion to clone the target file. Even in prior approaches that use B-tree data structures, the file system creates copies of every extent entry of the file. Such prior approaches are time-consuming and slow, particularly when a file is fragmented and has many extents, sometimes resulting in an operational time of O(N).

In one or more embodiments, responsive to a request to perform a file clone operation on the target file, at step 404, file system 200 generates a copy of a root node of the copy-on-write B-tree data structure pointed to by a first index node of the target file. As depicted in the example in FIG. 5C, file system 200 generates a node 506, which is a copy of a root node 504 of the COW B-tree data structure 510. Node 506 has an mode number R' and contains a copy of the plurality of entries in the node 504 (i.e., "<L0>→<X>", "<L190>→<Y>", etc.). That is, the root node copy 506 points to the same extents and tree nodes X, Y as the root node 504.

At step 406, file system 200 generates a second index node representing a file clone. This second index node points to the copy of the root node. For example, file system 200 generates a second index node 508 having an mode number 6, which points to the root node copy 506 (i.e., "<obj6, MAPTREE>→<root_addr_R'>"). Similar to the index node 502, index node 508 contains a key-value entry indicating that the entry maps to a COW B-tree data structure (e.g., "MAPTREE"), and includes an address of the root node copy 506 of the COW B-tree data structure 510 (e.g., "root_addr_R").

At step 408, file system 200 updates reference counts of nodes of the COW B-tree data structure that are pointed to by the copy of the root node. The reference counts of the nodes of the COW B-tree data structure that are pointed to by the copy of the root node are updated (e.g., incremented by one). In some embodiments, the update of the reference counts is limited to one level. That is, the reference counts of child nodes (i.e., the second level) of the nodes of the COW B-tree data structure that are pointed to by the copy of the root node are not updated. For example, file system 200 updates references counts of nodes X and Y from 1 to 2, representing that the root node copy 506 also now references nodes A and B. The reference counts of child nodes A, B, C, D of the nodes X, Y of the COW B-tree data structure 510 that are pointed to by the root node copy 506 are not incremented and remain at one. Accordingly, embodiments of the present disclosure may create a file clone on a target file without having to duplicate or update every data block or every entry representing an extent of the target file. File system 200 may manipulate the cloned file represented by the index node 508 (mode 6) using typical file operations and file system updates the COW B-tree data structure using techniques known in the art.

In some cases, over time, a file that has been converted under method 300 may no longer exceed the threshold number of extents. For example, file data may be deleted and corresponding extents may be removed from a file (and from the COW B-tree) as part of file operations. In some embodiments, responsive to determining that the file no longer exceeds the threshold number of extents, file system 200 may modify the index node to contain the plurality of entries. That is, file system 200 may convert the file back from using the COW B-tree and move the entries back into the index node. In some embodiments, file system 200 removes COW B-tree data structure 510 and inserts the mapping information directly into the original tree. In cases where the file is cloned, as described below, the cloned tree can be removed by reducing reference counts 212 of the nodes in the cloned B-tree data structure.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method, comprising:
   updating a first index node representing a file, the first index node comprising a plurality of entries representing extents of the file, wherein each entry of the plurality of entries comprises metadata that at least in part maps at least one logical address to at least one physical address of at least one data block of an extent of the file, wherein updating the first index node comprises at least one of adding, updating, or removing an entry at the first index node;
   determining whether a number of the plurality of entries included in the updated first index node exceeds a threshold corresponding to a number of extents; and
   responsive to determining that the number of the plurality of entries included in the updated first index node exceeds the threshold:
      generating a copy-on-write (COW) B-tree data structure containing the plurality of entries representing the extents of the file; and
      modifying the first index node to replace the plurality of entries representing the extents of the file with a new entry that points to the COW B-tree data structure.

2. The method of claim 1, further comprising:
   performing a file clone operation on the file comprising:
      generating a copy of a root node of the COW B-tree data structure, the root node and the copy of the root node each comprising the plurality of entries representing extents of the file, wherein the root node and copy of the root node initially both point directly or indirectly to same one or more physical addresses; and
      generating a second index node representing a file clone, wherein the second index node points to the copy of the root node.

3. The method of claim 2, wherein the file clone operation further comprises:
   updating reference counts of nodes of the COW B-tree data structure that are pointed to by the copy of the root node, wherein reference counts of child nodes of the nodes of the COW B-tree data structure that are pointed to by the copy of the root node are not updated.

4. The method of claim 1, further comprising:
   responsive to determining that the number of the plurality of entries included in the first index node no longer exceeds the threshold, modifying the first index node to contain the plurality of entries.

5. The method of claim 1, wherein modifying the first index node to replace the plurality of entries representing the extents of the file with the new entry that points to the COW B-tree data structure further comprises:
   inserting a key-value entry into the first index node, wherein a key of the entry comprises a type representing a COW B-tree data structure and a value of the entry comprises an address of the COW B-tree data structure.

6. A non-transitory computer-readable storage medium comprising instructions that, when executed in a computing device, perform the steps of:
   updating a first index node representing a file, the first index node comprising a plurality of entries representing extents of the file, wherein each entry of the plurality of entries comprises metadata that at least in part maps at least one logical address to at least one physical address of at least one data block of an extent of the file, wherein updating the first index node comprises at least one of adding, updating, or removing an entry at the first index node;
   determining whether a number of the plurality of entries included in the updated first index node exceeds a threshold corresponding to a number of extents; and
   responsive to determining that the number of the plurality of entries included in the updated first index node exceeds the threshold:
      generating a copy-on-write (COW) B-tree data structure containing the plurality of entries representing the extents of the file; and
      modifying the first index node to replace the plurality of entries representing the extents of the file with a new entry that points to the COW B-tree data structure.

7. The non-transitory computer-readable storage medium of claim 6, wherein the instructions perform a file clone operation on the file comprising:
   generating a copy of a root node of the COW B-tree data structure, the root node and the copy of the root node each comprising the plurality of entries representing extents of the file, wherein the root node and copy of the root node initially both point directly or indirectly to same one or more physical addresses; and
   generating a second index node representing a file clone, wherein the second index node points to the copy of the root node.

8. The non-transitory computer-readable storage medium of claim 7, wherein the file clone operation further comprises:
   updating reference counts of nodes of the COW B-tree data structure that are pointed to by the copy of the root node, wherein reference counts of child nodes of the nodes of the COW B-tree data structure that are pointed to by the copy of the root node are not updated.

9. The non-transitory computer-readable storage medium of claim 6, wherein the steps further comprise:
   responsive to determining that the number of the plurality of entries included in the first index node no longer exceeds the threshold, modifying the first index node to contain the plurality of entries.

10. The non-transitory computer-readable storage medium of claim 6, wherein the step of modifying the first index node to replace the plurality of entries representing the extents of the file with the new entry that points to the COW B-tree data structure further comprises:
    inserting a key-value entry into the first index node, wherein a key of the entry comprises a type representing a COW B-tree data structure and a value of the entry comprises an address of the COW B-tree data structure.

11. A computer system for allocating storage space, the computer system comprising:
    a storage device comprising a file system;
    a processor (CPU) configured to perform the steps of:
       updating a first index node representing a file, the first index node comprising a plurality of entries representing extents of the file, wherein each entry of the plurality of entries comprises metadata that at least in part maps at least one logical address to at least one physical address of at least one data block of an extent of the file, wherein updating the first index node comprises at least one of adding, updating, or removing an entry at the first index node;

determining whether a number of the plurality of entries included in the updated first index node exceeds a threshold corresponding to a number of extents; and responsive to determining that the number of the plurality of entries included in the updated first index node exceeds the threshold:

generating a copy-on-write (COW) B-tree data structure containing the plurality of entries representing the extents of the file; and modifying the first index node to replace the plurality of entries representing the extents of the file with a new entry that points to the COW B-tree data structure.

12. The computer system of claim 11, wherein the processor is further configured to perform a file clone operation on the file comprising:

generating a copy of a root node of the COW B-tree data structure, the root node and the copy of the root node each comprising the plurality of entries representing extents of the file, wherein the root node and copy of the root node initially both point directly or indirectly to same one or more physical addresses; and generating a second index node representing a file clone, wherein the second index node points to the copy of the root node.

13. The computer system of claim 12, wherein the file clone operation further comprises:

updating reference counts of nodes of the COW B-tree data structure that are pointed to by the copy of the root node, wherein reference counts of child nodes of the nodes of the COW B-tree data structure that are pointed to by the copy of the root node are not updated.

14. The computer system of claim 11, wherein the processor is further configured to perform the steps of:

responsive to determining that the number of the plurality of entries included in the first index node no longer exceeds the threshold, modifying the first index node to contain the plurality of entries.

15. The computer system of claim 11, wherein modifying the first index node to replace the plurality of entries representing the extents of the file with the new entry that points to the COW B-tree data structure further comprises:

inserting a key-value entry into the first index node, wherein a key of the entry comprises a type representing a COW B-tree data structure and a value of the entry comprises an address of the COW B-tree data structure.

* * * * *